US006709140B2

(12) United States Patent
Ui

(10) Patent No.: US 6,709,140 B2
(45) Date of Patent: Mar. 23, 2004

(54) VEHICLE HEADLAMP UNIT AND VEHICLE HEADLIGHT WITH THE HEADLAMP UNIT

(75) Inventor: Takahiro Ui, Gunma (JP)

(73) Assignee: Asahi Rise Co., Ltd., Gunma (JP)

( * ) Notice: Subject to any disclaimer, the term of this patent is extended or adjusted under 35 U.S.C. 154(b) by 0 days.

(21) Appl. No.: 10/307,338

(22) Filed: Dec. 2, 2002

(65) Prior Publication Data

US 2003/0128550 A1 Jul. 10, 2003

(30) Foreign Application Priority Data

Jan. 10, 2002 (JP) ....................................... 2002-003760

(51) Int. Cl.[7] ................................................ B60Q 1/06
(52) U.S. Cl. ....................... 362/526; 362/286; 362/523; 362/532
(58) Field of Search ................................ 362/523, 526, 362/531, 532, 285, 286, 288, 289

(56) References Cited

U.S. PATENT DOCUMENTS

| | | | | |
|---|---|---|---|---|
| 4,951,178 A | | 8/1990 | Shirai et al. | 362/61 |
| 4,987,521 A | | 1/1991 | Fratty et al. | 362/61 |
| 5,213,406 A | | 5/1993 | Neumann et al. | 362/512 |
| 5,339,226 A | | 8/1994 | Ishikawa | 362/512 |
| 5,911,502 A | | 6/1999 | Zillgitt et al. | 362/508 |
| 6,170,970 B1 | | 1/2001 | Eto | 362/539 |
| 6,176,604 B1 | | 1/2001 | Dubrovin et al. | 362/539 |
| 6,190,029 B1 | | 2/2001 | Taniuchi et al. | 362/512 |
| 6,428,187 B1 | * | 8/2002 | Shin | 362/286 |
| 6,478,459 B1 | * | 11/2002 | Ui | 362/512 |

* cited by examiner

*Primary Examiner*—Laura K. Tso
(74) *Attorney, Agent, or Firm*—Arent Fox Kintner Plotkin & Kahn, PLLC

(57) ABSTRACT

A vehicle headlamp unit includes a discharge lamp, a socket to which the discharge lamp is fitted, a base carrying the socket and being compatible with a base of a halogen bulb provided with a high beam filament and a low beam filament, and a moving mechanism, in response to a high beam mode or a low beam mode, for moving the socket in parallel along a direction perpendicular to a light axis of the vehicle headlamp unit without inclining a light axis of the discharge lamp.

22 Claims, 12 Drawing Sheets

VEHICLE HEADLAMP UNIT AND VEHICLE HEADLIGHT WITH THE HEADLAMP UNIT

FIELD OF THE INVENTION

The present invention relates to a vehicle headlamp unit with a light source of a discharge lamp, and to a vehicle headlight with the headlamp unit.

DESCRIPTION OF THE RELATED ART

A conventional headlight for a motor vehicle typically used was a projector type headlight or a multi-reflector type headlight with a light source of a halogen light bulb (iodine light bulb), a lens and a precisely condensing reflector arranged around the halogen bulb.

The projector type headlight adopts a standardized PE (poly-ellipsoid) reflector or DE (three dimensional ellipsoid) reflector, and the multi-reflector type headlight adopts a MS (multi-surface) reflector.

The halogen light bulb used for the headlight is nearly a point source of light with a relatively high efficiency of about 20 lumens/watt and a consumption power of 35–60 watts. Such halogen bulb operates at a low power voltage of 12 or 24 volts and therefore no specific electrical insulation is required. An average lifetime of the halogen bulb is about 400 hours. Due to the difference of bulb shapes, there are a plurality of specifications in the halogen bulb such as H-1 type, HB-1 type, H-4 type, HB-4 type, HB-5 type and H-7 type. For each type, a shape and a dimension of a light-bulb base made of plastic or ceramic are standardized.

In the past, the switching between high beam mode and low beam mode in the halogen bulb vehicle headlight had been performed by selectively turning-on one of two halogen bulbs respectively disposed at centers of the high beam reflector and the low beam reflector. Recently, such switching is performed by selectively turning-on one of two filaments in a single halogen light bulb, which are disposed with a distance of several millimeters each other. Namely, high beam light distribution is obtained by tuning-on only the high beam filament and by reflecting light from the filament at a reflector, whereas low beam light distribution is obtained by tuning-on only the low beam filament and by reflecting light from the filament at the same reflector in different condensing manner. The halogen bulbs of H-4 type, HB-1 type and HB-5 type are such two filaments bulbs.

FIGS. 1*a* and 1*b* show a cross sectional view and a side view of a HB-1 type halogen bulb with two filaments for high beam and low beam, and FIG. 2 shows a side view of the halogen bulb fitted in a socket that is fixed to a base.

As shown in these figures, the HB-1 type halogen bulb 10 has a high beam filament 12 and a low beam filament 13 in a glass capsule 11. The high beam filament 12 and the low beam filament 13 are located at different positions each other along a direction substantially perpendicular to the light axis Z of the halogen bulb. The halogen bulb 10 is fitted in the specific socket 14 that is fixed to the specific base 15. A black lightproof coating 16 is applied to the top end section of the glass capsule 11 to provide no glare from the filaments. Three terminal electrodes (including common grand electrode) 17 for the two filaments are formed in the rear of the base 15 as shown in FIG. 2. These electrodes 17 are electrically connected to a lighting circuit through lead lines, connectors and ground (not shown).

FIGS. 3*a* and 3*b* show a cross sectional view and a side view of a HB-5 type halogen bulb with two filaments for high beam and low beam.

As shown in these figures, the HB-5 type halogen bulb 30 also has a high beam filament 32 and a low beam filament 33 in a glass capsule 31. The high beam filament 32 and the low beam filament 33 are located at different positions each other along a direction substantially perpendicular to the light axis Z as well as in HB-1 type halogen bulb. A black lightproof coating 36 is applied to the top end section of the glass capsule 31 to provide no glare form the filaments.

The high beam filament 12 and the low beam filament 13 of the above-mentioned halogen bulb 10 are spaced by several millimeters from each other along a direction substantially perpendicular to the light axis Z as well as the high beam filament 32 and the low beam filament 33 of the halogen bulb 30. The filaments 12 and 13 of the HB-1 type halogen bulb 10 run along a direction perpendicular to the light axis Z whereas the filaments 32 and 33 of the HB-5 type halogen bulb 30 run along a direction parallel to the light axis Z. The length of these filaments 12, 13, 32 and 33 is about 5 millimeters.

Recently, the adoption of a headlamp unit with a high intensity discharge (HID) lamp is studied and put partially to practical use as a next-generation vehicle headlight instead of the vehicle headlight using the halogen bulb(s).

The discharge lamp used in such vehicle headlamp unit operates with a high power voltage of about 20,000 volts, and radiates light with a extremely high efficiency of about 100 lumens±15%/watt for example. Thus, the discharge lamp provides light flux substantially twice as strong as that of the halogen bulb and low power consumption, typically about 35 watts. Further, the discharge lamp has a lifetime of about four times as long as that of the halogen bulb. Therefore, the discharge lamp saves energy and thus is extremely ideal for a vehicle headlight.

However, a conventional vehicle headlamp unit using such discharge lamp has following disadvantages:

(1) It is impossible to form two light sources in a single bulb like as H4 type, HB-1 type and HB-5 type halogen bulbs;

(2) Mounting of two individual discharge lamps near the center of a reflector is difficult due to no enough space and causes the design of the reflector to make difficult and the manufacturing cost of the reflector to increase; and (3) Glare cannot be prevented if a discharge lamp is substituted for a halogen bulb in the vehicle headlamp unit.

The applicant of this application has proposed, in U.S. Pat. Ser. No. 09/562,863, a vehicle headlamp unit with a discharge lamp, a shade arranged near the discharge lamp and a moving means for relatively moving the discharge lamp and the shade relative to each other by sliding one of them in a direction along the light axis of the headlamp unit or by rotating one of them so as to switch between high beam mode and low beam mode.

However, this proposed headlamp unit cannot be compatible with a headlamp unit with a halogen bulb having a high beam filament and a low beam filament located at different positions each other along a direction substantially perpendicular to the light axis Z, such as an HB-5 type halogen bulb or an HB-1 type halogen bulb. Namely, in case of the proposed headlamp unit relatively moving the discharge lamp and the shade by sliding one of them in a direction along the light axis, positions of the light source will differ from the filament positions of the HB-5 type or HB-1 type halogen bulb as a matter of course. In case of the proposed headlamp unit for relatively moving the discharge lamp and the shade by rotating one of them, the light axis direction will change causing its light distribution to differ from that of the headlamp unit with the HB-5 type or HB-1 type halogen bulb.

For the halogen bulb used for vehicle headlight, a black lightproof coating is in general applied to its top end section so as to shield light along the light axis Z and thus to prevent glare from the filaments, as shown in FIGS. 1*b*, 2 and 3*b*. However, in case of the discharge lamp, it is impossible to apply such black lightproof coating to its top end section due to its shape and size.

SUMMARY OF THE INVENTION

It is therefore an object of the present invention to provide a vehicle headlamp unit with a discharge lamp and a vehicle headlight with the headlamp unit, whereby it is compatible with a headlamp unit with a halogen bulb that has a high beam filament and a low beam filament located at different positions each other along a direction substantially perpendicular to the light axis, and can provide correct light distributions of high beam mode and low beam mode as well as the halogen bulb head lamp unit.

Another object of the present invention is to provide a vehicle headlamp unit with a discharge lamp and a vehicle headlight with the headlamp unit, whereby prevention of glare can be easily attained.

According to the present invention, a vehicle headlamp unit includes a discharge lamp, a socket to which the discharge lamp is fitted, a base carrying the socket and being compatible with a base of a halogen bulb provided with a high beam filament and a low beam filament, and a moving mechanism, in response to a high beam mode or a low beam mode, for moving the socket in parallel along a direction perpendicular to a light axis of the vehicle headlamp unit without inclining a light axis of the discharge lamp.

Also, according to the present invention, a vehicle headlight has a reflector, a lens arranged in front of the reflector and a vehicle headlamp unit with a light-emitting portion arranged in front of the reflector. The vehicle headlamp unit includes a discharge lamp, a socket to which the discharge lamp is fitted, a base carrying the socket and being compatible with a base of a halogen bulb provided with a high beam filament and a low beam filament, and a moving mechanism, in response to a high beam mode or a low beam mode, for moving the socket in parallel along a direction perpendicular to a light axis of the vehicle headlamp unit without inclining a light axis of the discharge lamp.

Since the base is compatible with a base of a halogen bulb provided with a high beam filament and a low beam filament and the socket and the discharge lamp fitted to the socket is movable in parallel along a direction perpendicular to a light axis of the vehicle headlamp unit without inclining a light axis of the discharge lamp in response to a high beam mode or a low beam mode, this headlamp unit can be adopted as it is to any vehicle headlight using a light source of a halogen bulb instead of the halogen bulb headlamp unit. Also, it is possible to provide correct light distributions of the high beam mode and the low beam mode as well as the halogen bulb headlamp unit.

Furthermore, since the discharge lamp moves in parallel along a direction perpendicular to the light axis of the headlamp unit without inclining the light axis of the discharge lamp, light distribution of from the discharge lamp will not change due to the movement. Thus, perfectly the same high beam and low beam light-distributions as the halogen bulb headlamp unit can be expected.

It is preferred that the moving mechanism linearly moves an light-emitting portion of the discharge lamp between positions corresponding to a position of the high beam filament and a position of the low beam filament.

It is also preferred that the vehicle headlamp unit further includes a cylindrical housing being integral with the base, and that the moving mechanism is mounted in the housing. Since the moving mechanism is accommodated in the housing to attain a smaller size of the headlamp unit, interchange of this headlamp unit to the conventional headlamp unit with a halogen bulb can be performed easily.

It is further preferred that the moving mechanism includes a first sliding member being slidable along a direction parallel to the light axis of the vehicle headlamp unit, a drive mechanism for driving the first sliding member in the direction parallel to the light axis of the vehicle headlamp unit, a second sliding member being integral with the socket and slidable along a direction perpendicular to the light axis of the vehicle headlamp unit, and a conversion mechanism for converting movement of the first sliding member along the direction parallel to the light axis of the vehicle headlamp unit to movement of the second sliding member along the direction perpendicular to the light axis of the vehicle headlamp unit.

It is preferred that the conversion mechanism includes at least one slit being formed in the second sliding member and running along a direction tilted with respect to the light axis of the headlamp unit in a plane including the directions parallel and perpendicular to the light axis of the headlamp unit, and at least one pins being attached to the first sliding member and slidable through the at least one slit.

It is also preferred that the conversion mechanism further includes at least one first sliding surface formed on the first sliding member and running along a direction tilted with respect to the light axis of the headlamp unit in a plane including the directions parallel and perpendicular to the light axis of the headlamp unit, and at least one second sliding surface formed on the second sliding member and running along a direction tilted with respect to the light axis of the headlamp unit in a plane including the directions parallel and perpendicular to the light axis of the headlamp unit, the at least one second sliding surface sliding over the at least one first sliding surface.

It is also preferred that the at least one first sliding surface and the at least one second sliding surface are located in front of the at least one slit and the at least one pin.

It is preferred that the drive mechanism is a solenoid located in a rear direction of the first sliding member.

It is preferred that the vehicle headlamp unit further includes a first shade fixed to the base for shielding a part of light radiated from the discharge lamp. In this case, it is more preferred that the vehicle headlamp unit further includes a second shade detachably attached to a top end section of the first shade for shielding a part of light forwardly radiated from the discharge lamp. Thus, no glare from the discharge lamp of the vehicle headlamp unit can be easily ensured.

It is further preferred that the base is a base being compatible with a base of an HB-5 type halogen bulb.

Further objects and advantages of the present invention will be apparent from the following description of the preferred embodiments of the invention as illustrated in the accompanying drawings.

DESCRIPTION OF THE PREFERRED EMBODIMENTS

Figure 4:
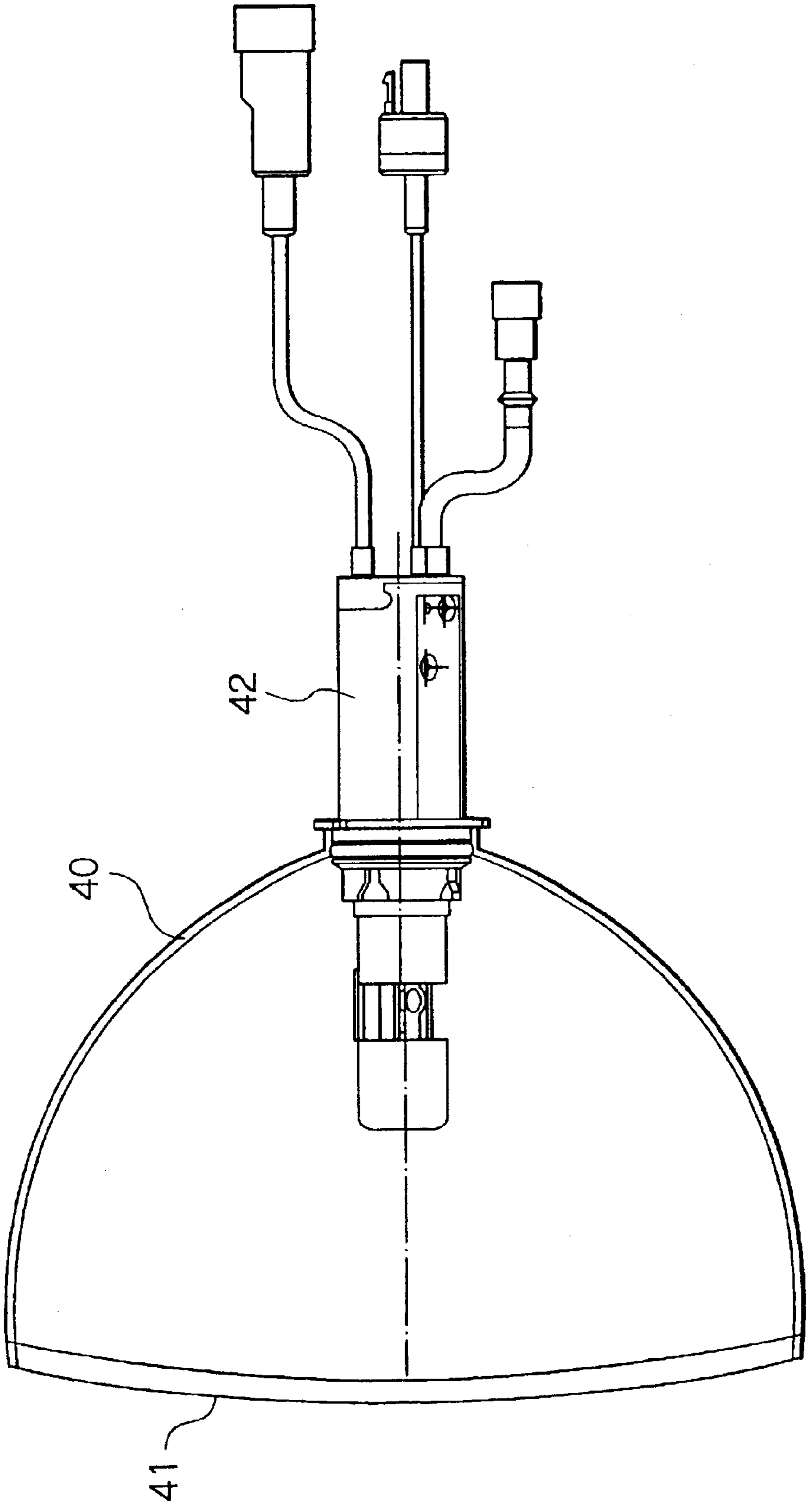
FIG. 4 shows a side view schematically illustrating the whole of a vehicle headlight as a preferred embodiment according to the present invention.
Figure 5:
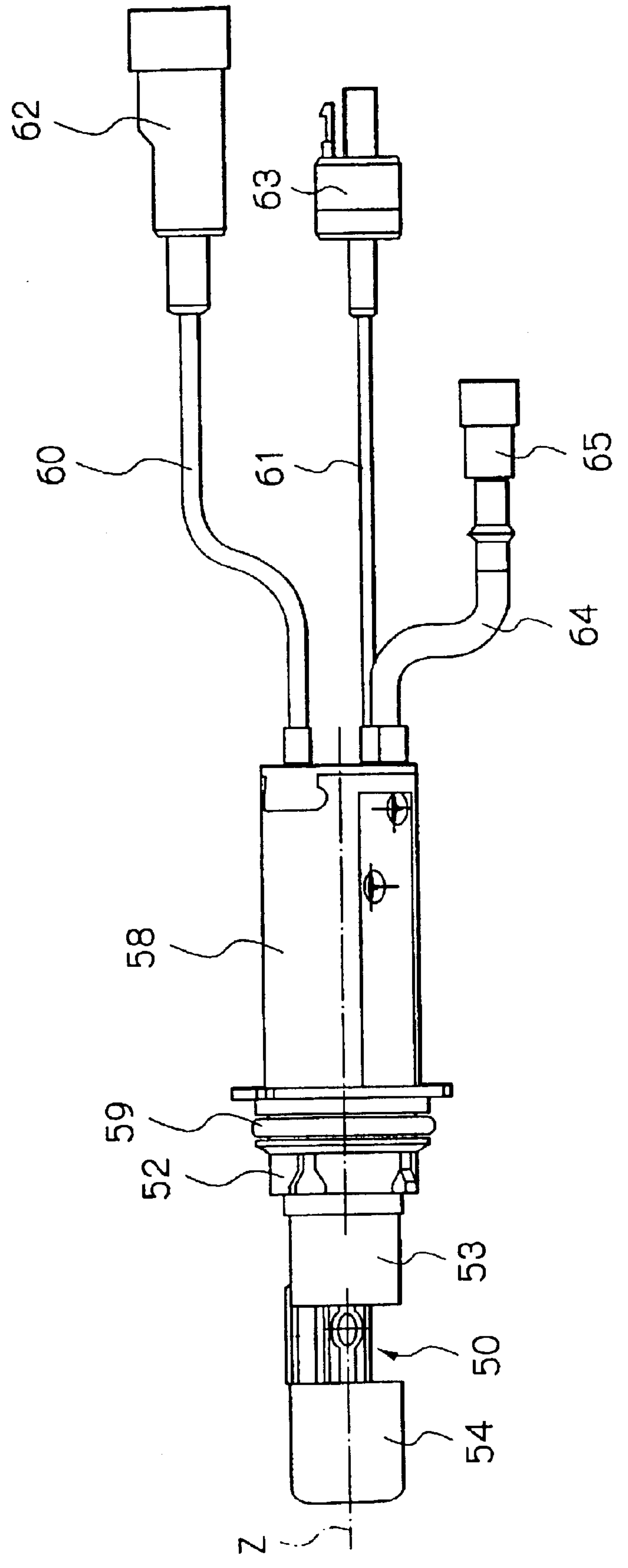
FIG. 5 shows a side view illustrating an appearance of the vehicle headlamp unit in the embodiment of FIG. 4 when the headlamp unit is in low beam mode.
Figure 6:
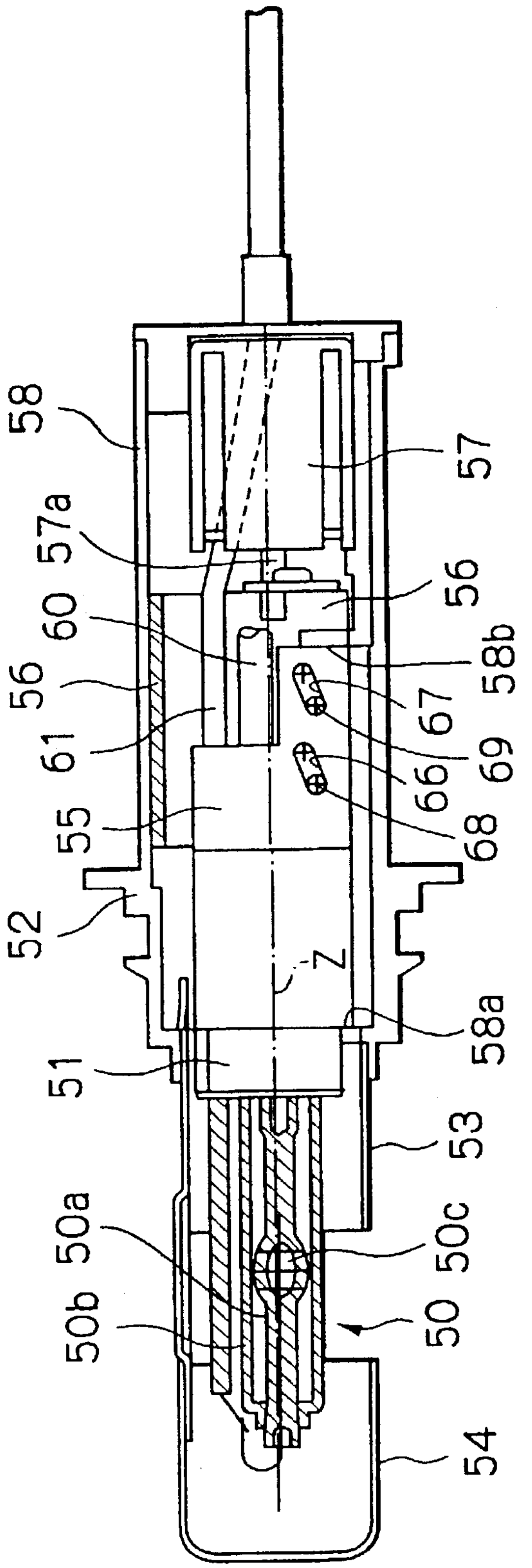
FIG. 6 shows a partially sectional view illustrating an internal structure of the vehicle headlamp unit in the embodiment of FIG. 4 when the headlamp unit is in low beam mode.
Figure 7:
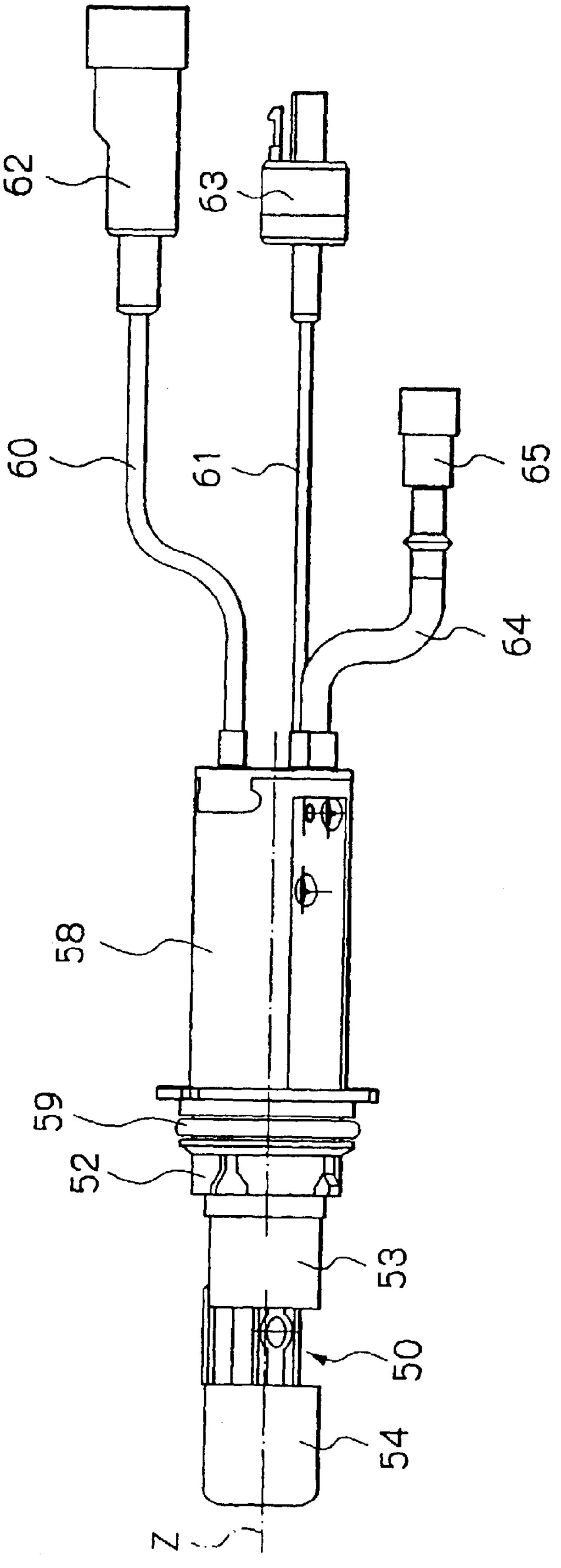
FIG. 7 shows a side view illustrating an appearance of the vehicle headlamp unit in the embodiment of FIG. 4 when the headlamp unit is in high beam mode.
Figure 8:
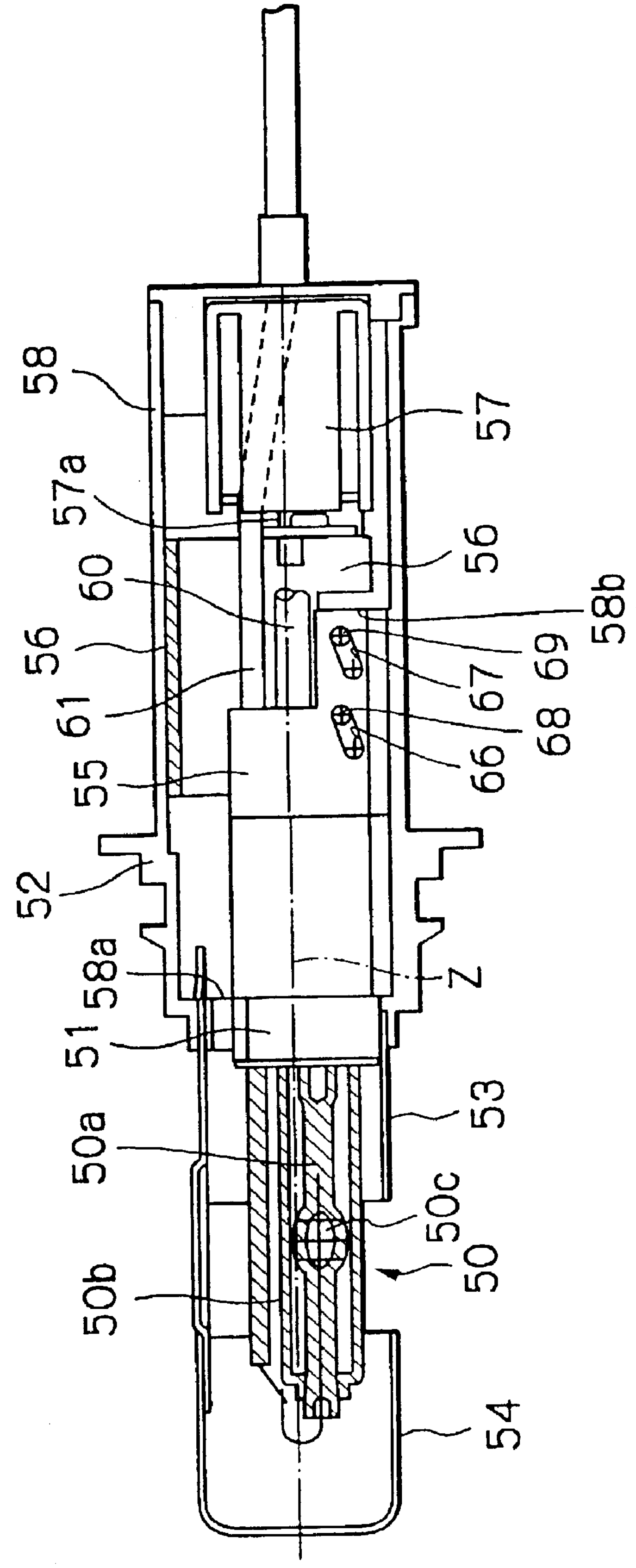
FIG. 8 shows a partially sectional view illustrating an internal structure of the vehicle headlamp unit in the embodiment of FIG. 4 when the headlamp unit is in high beam mode.
Figure 9A:
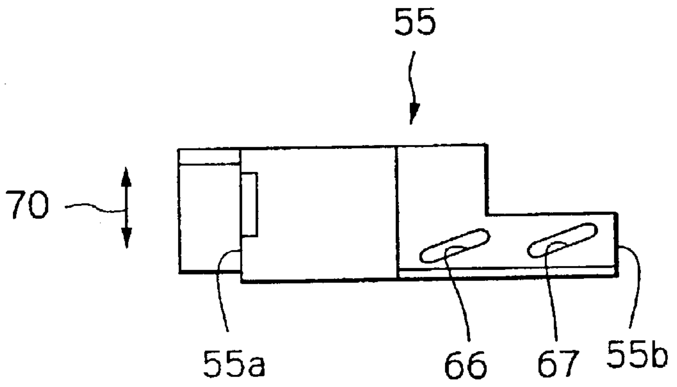
FIGS. 9*a* and 9*b* show a side view of a second sliding member and a cross sectional view of a first sliding member illustrating a low beam/high beam switching mechanism of the vehicle headlamp unit in the embodiment of FIG. 4.
Figure 9B:
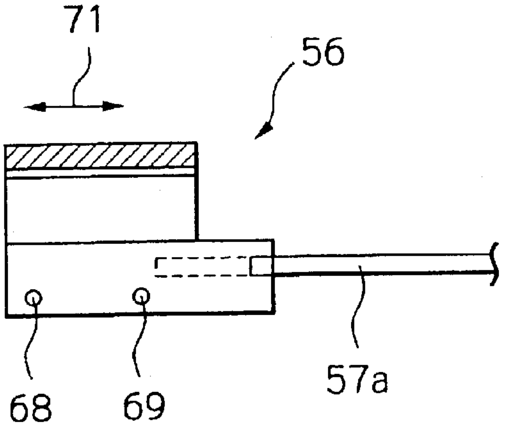

FIG. 4 schematically illustrates the whole of a vehicle headlight as a preferred embodiment according to the present invention, FIGS. 5 and 6 illustrate the vehicle headlamp unit in this embodiment when in low beam mode, FIGS. 7 and 8 illustrate the vehicle headlamp unit in this embodiment when in high beam mode, and FIGS. 9*a* and 9*b* illustrate a low beam/high beam switching mechanism of the vehicle headlamp unit in this embodiment. This embodiment is an example of the vehicle headlight using a headlamp unit that is provided with a discharge lamp and compatible with the HB-5 type halogen bulb.

As shown in FIG. 4, the vehicle headlight is mainly constituted by a reflector 40, an optical lens 41 arranged in front of the reflector 40 and a headlamp unit 42 with a light base fitted to the reflector 40.

The reflector 40 and the lens 41 may be configured by the conventional reflector and lens in the conventional vehicle headlight using the HB-5 type halogen bulb. The headlamp unit 42 is arranged so that a light source of a discharge lamp is located near the center axis at the center of the reflector 40, and thus light reflected by the reflector 40 is distributed frontward via the lens 41.

As shown in FIGS. 5 to 9*b*, this headlamp unit 42 includes a discharge lamp 50, a socket 51 to which the discharge lamp 50 is fitted, a light base 52 which is compatible with a light base of the HB-5 type halogen bulb, a first shade 53 with a basically cylindrical shape fixed to the base 52 so as to shield a base section of the discharge lamp 50, a detachable second shade 54 with a cap shape attached to a support arm fixed to the top of the first shade 53, a second sliding member 55 that is united or integral with the socket 51 and slidable in a direction perpendicular to the light axis or longitudinal axis Z of the headlamp unit, a first sliding member 56 that is slidable in a direction parallel to the light axis Z of the headlamp unit, a magnetic solenoid 57 with a moving core 57*a* attached to the first sliding member 56, and a cylindrical housing 58 that is united or integral with the base 52 for accommodating the socket 51, the first and second sliding members 56 and 55 and the solenoid 57.

The discharge lamp 50 is a cylindrically shaped vehicle HID lamp such as a metal halide lamp and has an inner bulb 50*a* and an outer bulb 50*b* surrounding the inner bulb 50*a*.

The socket 51 is made of an insulation material such as plastic or ceramic material and in this embodiment united with the second sliding member 55.

The base 52 is made of an insulation material such as plastic or ceramic material and in this embodiment united with the housing 58. This base 52 is compatible with the base of the HB-5 type halogen bulb. An O-ring 59 is fitted around the base 52 to increase residence to dust and water. Lead lines 60 and 61 with one ends electrically connected to electrodes of the discharge lamp 50 are drawn out from the rear end of the housing 58 located at the rear of the base 52. The other ends of the lead lines 60 and 61 are connected to connectors 62 and 63, respectively. Also, from the rear end of the housing 58, a lead line 64 for controlling the solenoid 51 is drawn out and its other end is connected to a connector 65.

The first and second shades 53 and 54 are formed by a metal plate member in the aforementioned cylindrical shape and cap shape. The first shade 53 is tightly fixed to the base 52 and the second shade 54 is attached to the support arm fixed to the top of the first shade 53. However, this second shade 54 is detachable. These first and second shades 53 and 54 function to open only the middle section of the discharge lamp 50 and to shield the top and base sections of the discharge lamp 50. Thus, light from a light-emitting portion 50*c* of the discharge lamp 50 will not directly radiated toward the lens 41 (FIG. 4) located in front of the lamp 50 but light radiated in a direction perpendicular to the light axis Z of the headlamp unit is reflected by the reflector 40 and appropriately distributed frontward. As a result, it is possible to effectively prevent glare from the discharge lamp. Depending upon shapes of reflector and lens of a headlight, no second shade 54 may be required for preventing glare. Thus, the second shade 54 is formed in detachable structure. Shapes and sizes of these first and second shades 53 and 54 should be properly designed in consideration of the structure of reflector and lens, the type of base and the location of discharge lamp in the headlight to be fitted.

The second sliding member 55 is united or integral with the socket 51 and is slidable only along a direction 70 (FIG. 9*a*) perpendicular to the light axis Z of the headlamp unit. This is because movement of this second sliding member 55 is restricted by abutting its end walls 55*a* and 55*b* to inner walls 58*a* and 58*b* of the housing 58, respectively.

The first sliding member 56 is slidable along a cylindrical inner wall of the housing 58 or a direction 71 (FIG. 9*b*) parallel to the light axis Z of the headlamp unit. To this first sliding member 56, the moving core 57*a* of the magnetic solenoid 57 fixed to the housing 58 is attached. When the solenoid 57 is energized and thus the moving core 57*a* moves in a direction parallel to the light axis Z of the headlamp unit, the first sliding member 56 also moves along this parallel direction.

In the second sliding member 55, two slits 66 and 67 each running along a direction tilted with respect to the light axis Z in a plane including the light axis direction of the headlamp unit and a sliding direction of the second sliding member are formed. On the other hand, to the first sliding member 56, both end sections of two pins 68 and 69 passing through the respective slits 66 and 67 and being slidable there through are fixed. Thus, when the solenoid 57 is driven and therefore the first sliding member 56 moves along the direction parallel to the light axis Z of the headlamp unit, the pins 68 and 69 move and slide along the respective slits 66 and 67 resulting that the second sliding member 55 moves along the direction perpendicular to the light axis Z of the headlamp unit.

Figure 1B:
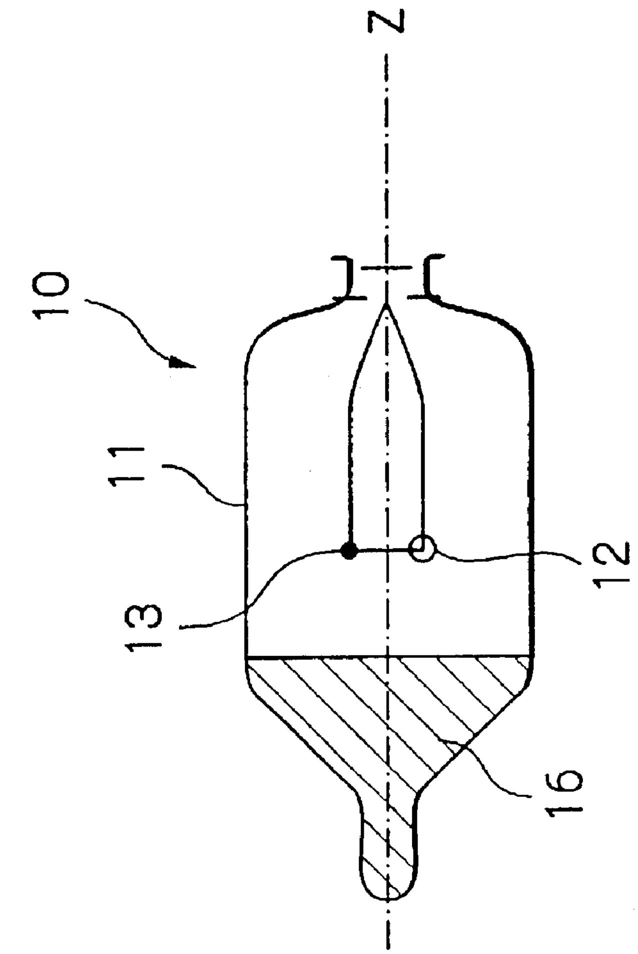
FIGS. 1*a* and 1*b* already described show a cross sectional view and a side view illustrating a HB-1 type halogen bulb with two filaments for high beam and low beam.
Figure 1A:
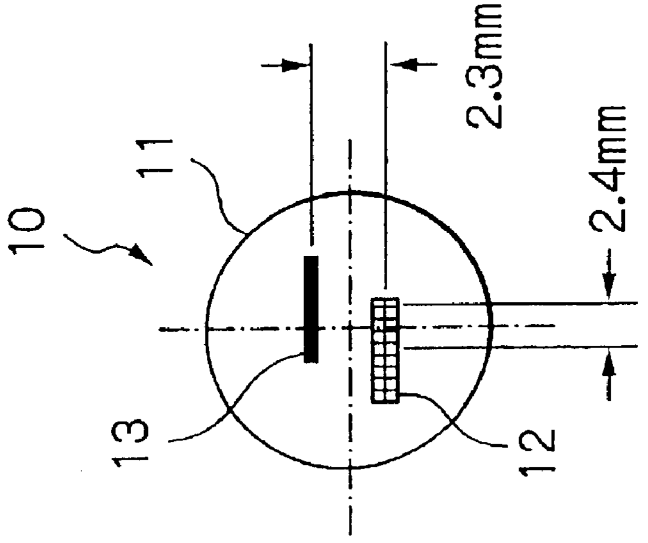
Figure 2:
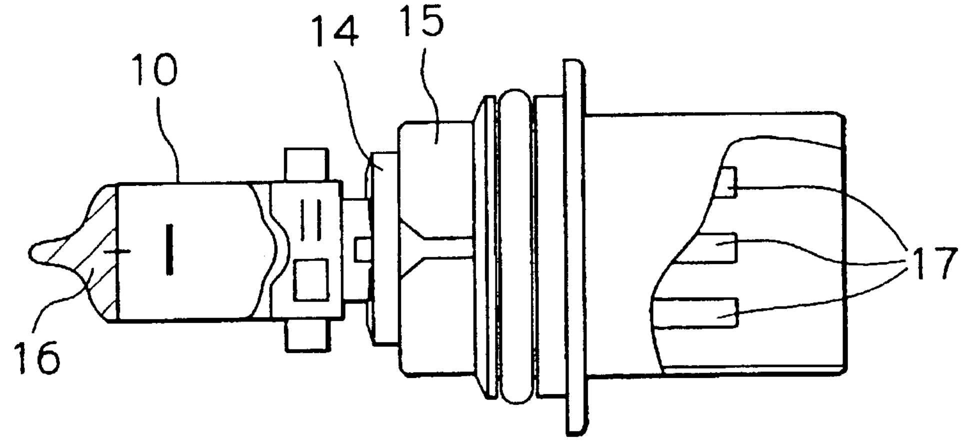
FIG. 2 already described shows a side view illustrating the halogen bulb fitted in a socket that is fixed to a base.
Figure 3B:
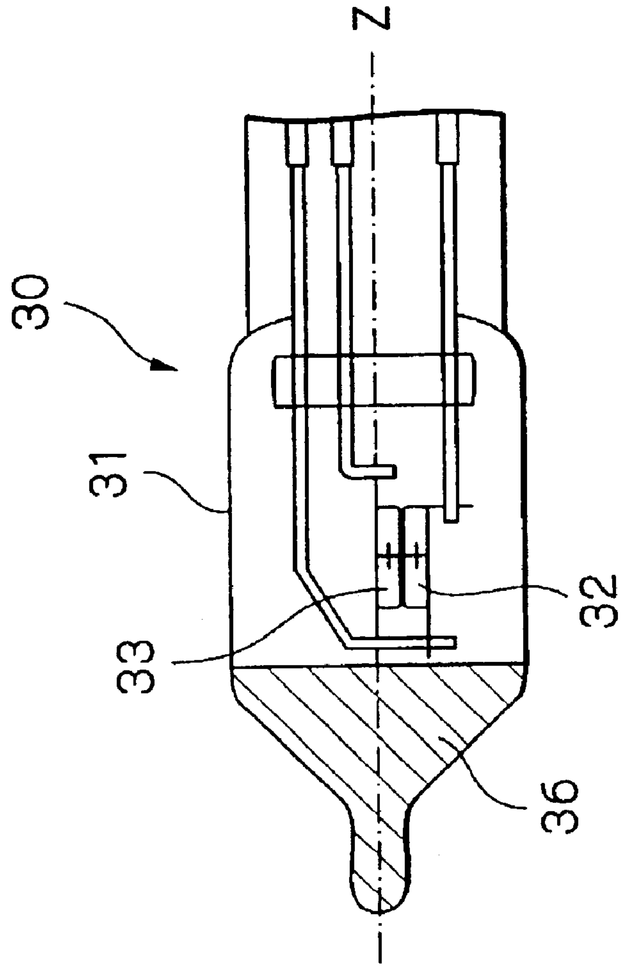
FIGS. 3*a* and 3*b* already described show a cross sectional view and a side view illustrating a HB-5 type halogen bulb with two filaments for high beam and low beam.
Figure 3A:
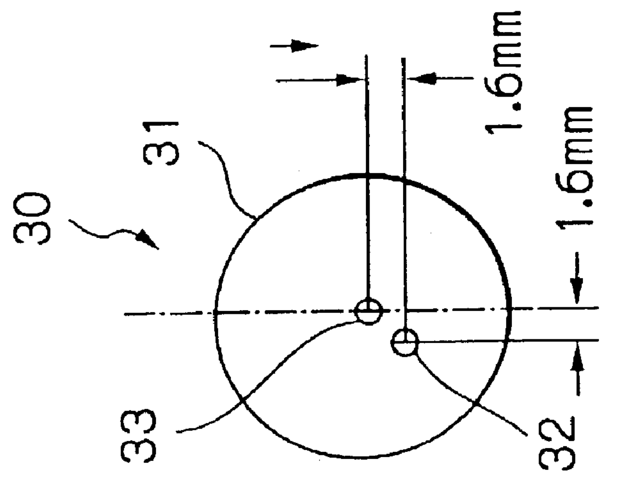

Due to this movement of the second sliding member 55 along the direction perpendicular to the light axis Z of the headlamp unit, the light-emitting portion 50*c* of the discharge lamp 50 moves along the direction perpendicular to the light axis Z of the headlamp unit without inclining the light axis of the discharge lamp 50. If it is designed that a position of the light-emitting portion 50*c* when the pins 68 and 69 locate at the left ends of the respective slits 66 and 67 as shown in FIG. 6 is aligned with a position of the low beam filament (33 in FIGS. 3*a* and 3*b*) of the HB-5 type halogen bulb, and that a position of the light-emitting portion 50*c* when the pins 68 and 69 locate at the right ends of the respective slits 66 and 67 as shown in FIG. 8 is aligned with a position of the high beam filament (32 in FIGS. 3*a* and 3*b*) of the HB-5 type halogen bulb, precise switching between low beam mode and high beam mode can be achieved only by driving the solenoid 57 in back and force directions.

As aforementioned, the headlamp unit in this embodiment has the light base 52 compatible to that of the HB-5 type halogen bulb. Also, in this headlamp unit, the light-emitting portion 50*c* of the discharge lamp 50 moves in parallel along a direction perpendicular to the light axis of the headlamp unit and reaches to a position corresponding to that of the high beam filament or the low beam filament of the HB-5 type halogen bulb when the solenoid 57 is driven in response to high beam mode or low beam mode. Thus, the headlamp unit in this embodiment can be adopted as it is to any vehicle headlight using a light source of a HB-5 type halogen bulb instead of the halogen bulb headlamp unit. Also, the headlamp unit in this embodiment can provide correct light distributions of the high beam mode and the low beam mode as well as the halogen bulb headlamp unit.

Furthermore, since the discharge lamp 50 moves in parallel along a direction perpendicular to the light axis Z of the headlamp unit without inclining the light axis of the discharge lamp, light distribution of from the discharge lamp 50 will not change due to the movement. Thus, perfectly the same high beam and low beam light-distributions as the two-filaments halogen bulb headlamp unit can be expected. Also, since the solenoid 57 is accommodated in the housing 58 to attain a smaller size of the headlamp unit, interchange of this headlamp unit to the conventional headlamp unit with a halogen bulb can be performed easily.

In addition, the first and second shades 53 and 54 ensure no glare from the discharge lamp of the vehicle headlamp unit.

Figure 10:
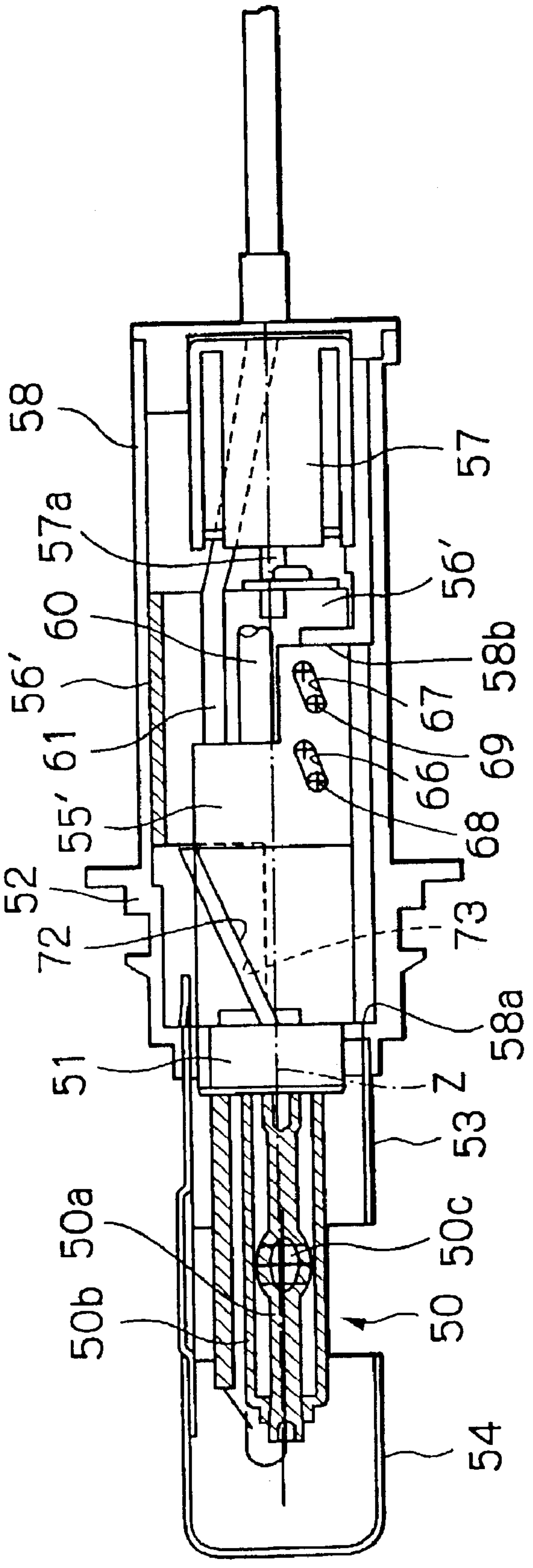
FIG. 10 shows a partial cross sectional view illustrating an internal structure of a vehicle headlamp unit in another embodiment according to the present invention, when the headlamp unit is in low beam mode.
Figure 11:
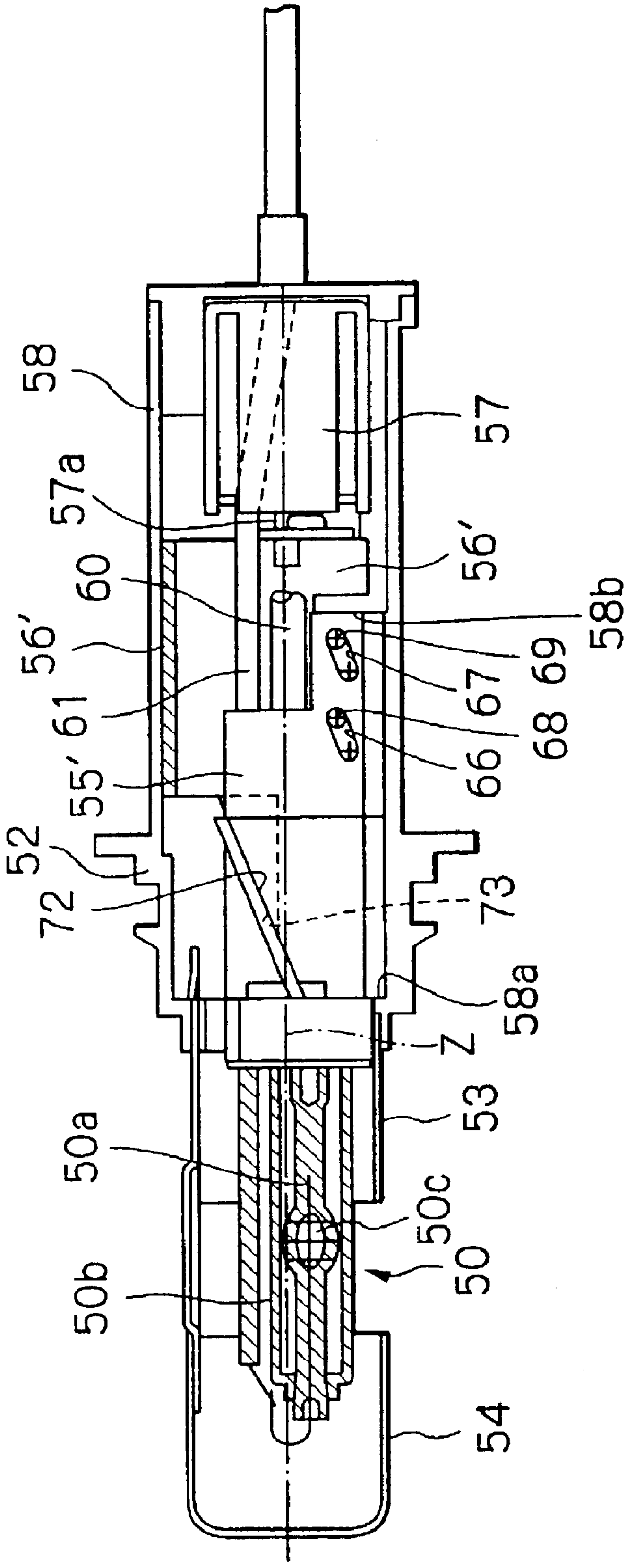
FIG. 11 shows a partially sectional view illustrating an internal structure of the vehicle headlamp unit in the embodiment of FIG. 10 when the headlamp unit is in high beam mode.
Figure 12A:
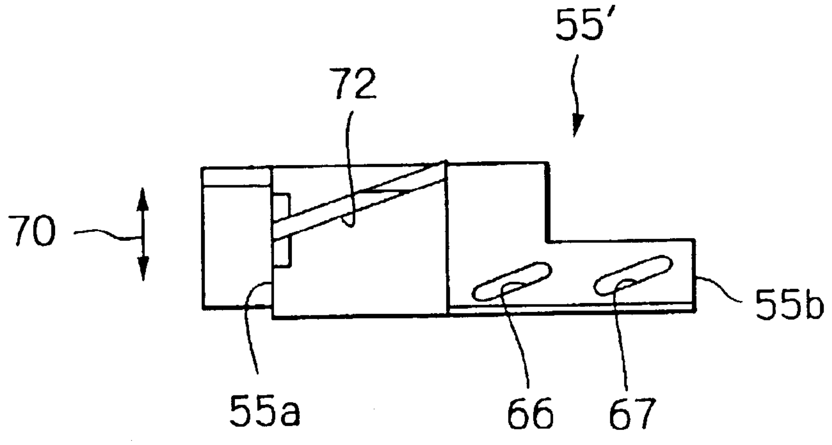
FIGS. 12*a* and 12*b* show a side view of a second sliding member and a cross sectional view of a first sliding member illustrating a low beam/high beam switching mechanism of the vehicle headlamp unit in the embodiment of FIG. 10.
Figure 12B:
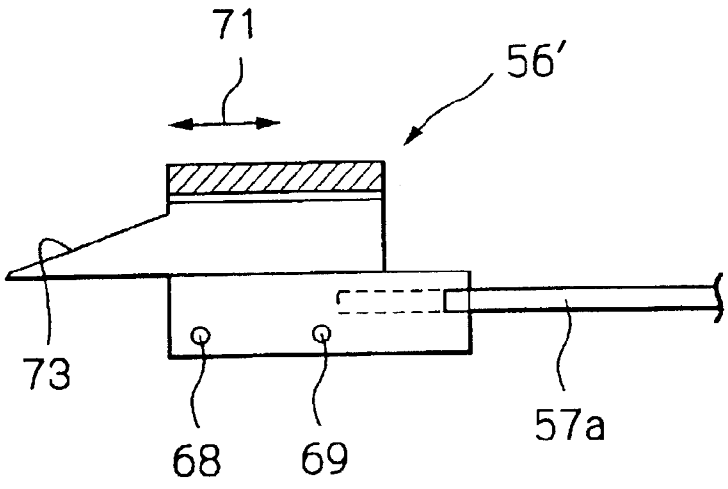

FIG. 10 illustrates a vehicle headlamp unit in another embodiment according to the present invention when in low beam mode, FIG. 11 illustrates the vehicle headlamp unit in this embodiment when in high beam mode, and FIGS. 12*a* and 12*b* illustrate a low beam/high beam switching mechanism of the vehicle headlamp unit in this embodiment. This embodiment is also an example of the vehicle headlight using a headlamp unit that is provided with a discharge lamp and compatible with the HB-5 type halogen bulb.

Structure of the headlamp unit in this embodiment has substantially the same as that of the headlamp unit in the embodiment shown in FIGS. 4–9*b* except for a partial structure of a second sliding member and a first sliding member. Therefore, in FIGS. 10, 11, 12*a* and 12*b*, the same reference numerals are used for elements that are substantially the same as these shown in FIGS. 5, 7, 9*a* and 9*b*.

In this embodiment, as apparently illustrated in FIGS. 12*a* and 12*b*, the second sliding member 55' has two sliding surfaces 72 in front of the slits 66 and 67. Each sliding surface 72 runs along a direction tilted with respect to the light axis Z of the headlamp unit in a plane including the light axis direction of the headlamp unit and a sliding direction of the second sliding member. On the other hand, the first sliding member 56' also has two sliding surfaces 73 in front of the slits 66 and 67. Each sliding surface 73 runs along a direction tilted with respect to the light axis Z of the headlamp unit in a plane including the light axis direction of the headlamp unit and a sliding direction of the second sliding member, and thus slides along and in contact with the sliding surface 72 of the second sliding member 55'. As a result, the second sliding member 55' can move in response to the movement of the first sliding member 56' more stably and smoothly than that in the embodiment of FIGS. 4–9*b*.

Another operations and advantages in this embodiment are substantially the same as these in the embodiment of FIGS. 4–9*b*.

In the aforementioned embodiments, the headlamp units compatible with the HB-5 type halogen bulb are illustrated. It is apparent however that a headlamp unit according to the present invention is compatible with another two-filaments type halogen bulb such as HB-1 type halogen bulb.

The number of slits, pins and first and second sliding surfaces is not limited to two as in the aforementioned embodiments but may be one or three or more. Also, instead of pins, projections partially inserted into the respective slits may be used.

Many widely different embodiments of the present invention may be constructed without departing from the spirit and scope of the present invention. It should be understood that the present invention is not limited to the specific embodiments described in the specification, except as defined in the appended claims.

What is claimed is:

1. A vehicle headlamp unit comprising:

a discharge lamp;

a socket to which said discharge lamp is fitted;

a base carrying said socket and being compatible with a base of a halogen bulb provided with a high beam filament and a low beam filament; and a moving means, in response to a high beam mode or a low beam mode, for moving said socket in a direction perpendicular relative to a light axis of the vehicle headlamp unit without inclining a light axis of said discharge lamp.

2. The vehicle headlamp unit as claimed in claim 1, wherein said moving means linearly moves an light-emitting portion of said discharge lamp between positions corresponding to a position of said high beam filament and a position of said low beam filament.

3. The vehicle headlamp unit as claimed in claim 1, wherein said vehicle headlamp unit further comprises a cylindrical housing being integral with said base, and wherein said moving means is mounted in said housing.

4. The vehicle headlamp unit as claimed in claim 1, wherein said moving means comprises a first sliding member being slidable along a direction parallel to the light axis of the vehicle headlamp unit, a drive means for driving said first sliding member in the direction parallel to the light axis of the vehicle headlamp unit, a second sliding member being integral with said socket and slidable along a direction perpendicular to the light axis of the vehicle headlamp unit, and a conversion means for converting movement of said first sliding member along the direction parallel to the light axis of the vehicle headlamp unit to movement of said second sliding member along the direction perpendicular to the light axis of the vehicle headlamp unit.

5. The vehicle headlamp unit as claimed in claim 4, wherein said conversion means comprises at least one slit being formed in said second sliding member and running along a direction tilted with respect to the light axis of the headlamp unit in a plane including the directions parallel and perpendicular to the light axis of the headlamp unit, and at least one pins being attached to said first sliding member and slidable through said at least one slit.

6. The vehicle headlamp unit as claimed in claim 5, wherein said conversion means further comprises at least one first sliding surface formed on said first sliding member and running along a direction tilted with respect to the light axis of the headlamp unit in a plane including the directions parallel and perpendicular to the light axis of the headlamp unit, and at least one second sliding surface formed on said second sliding member and running along a direction tilted with respect to the light axis of the headlamp unit in a plane including the directions parallel and perpendicular to the light axis of the headlamp unit, said at least one second sliding surface sliding over said at least one first sliding surface.

7. The vehicle headlamp unit as claimed in claim 6, wherein said at least one first sliding surface and said at least one second sliding surface are located in front of said at least one slit and said at least one pin.

8. The vehicle headlamp unit as claimed in claim 4, wherein said drive means is a solenoid located in a rear direction of said first sliding member.

9. The vehicle headlamp unit as claimed in claim 1, wherein said vehicle headlamp unit further comprises a first shade fixed to said base for shielding a part of light radiated from said discharge lamp.

10. The vehicle headlamp unit as claimed in claim 9, wherein said vehicle headlamp unit further comprises a second shade detachably attached to a top end section of said first shade for shielding a part of light forwardly radiated from said discharge lamp.

11. The vehicle headlamp unit as claimed in claim 1, wherein said base is a base being compatible with a base of an HB-5 type halogen bulb.

12. A vehicle headlight including a reflector, a lens arranged in front of said reflector and a vehicle headlamp unit with a light-emitting portion arranged in front of said reflector, said vehicle headlamp unit comprising:

a discharge lamp;

a socket to which said discharge lamp is fitted;

a base carrying said socket and being compatible with a base of a halogen bulb provided with a high beam filament and a low beam filament; and a moving means, in response to a high beam mode or a low beam mode, for moving said socket in a direction perpendicular relative to a light axis of said vehicle headlamp unit without inclining a light axis of said discharge lamp.

13. The vehicle headlight as claimed in claim 12, wherein said moving means of the headlamp unit linearly moves an light-emitting portion of said discharge lamp between positions corresponding to a position of said high beam filament and a position of said low beam filament.

14. The vehicle headlight as claimed in claim 12, wherein said vehicle headlamp unit further comprises a cylindrical housing being integral with said base, and wherein said moving means is mounted in said housing.

15. The vehicle headlight as claimed in claim 12, wherein said moving means of the headlamp unit comprises a first sliding member being slidable along a direction parallel to the light axis of the vehicle headlamp unit, a drive means for driving said first sliding member in the direction parallel to the light axis of the vehicle headlamp unit, a second sliding member being integral with said socket and slidable along a direction perpendicular to the light axis of the vehicle headlamp unit, and a conversion means for converting movement of said first sliding member along the direction parallel to the light axis of the vehicle headlamp unit to movement of said second sliding member along the direction perpendicular to the light axis of the vehicle headlamp unit.

16. The vehicle headlight as claimed in claim 15, wherein said conversion means of the headlamp unit comprises at least one slit being formed in said second sliding member and running along a direction tilted with respect to the light axis of the headlamp unit in a plane including the directions parallel and perpendicular to the light axis of the headlamp unit, and at least one pins being attached to said first sliding member and slidable through said at least one slit.

17. The vehicle headlight as claimed in claim 16, wherein said conversion means further comprises at least one first sliding surface formed on said first sliding member and running along a direction tilted with respect to the light axis of the headlamp unit in a plane including the directions parallel and perpendicular to the light axis of the headlamp unit, and at least one second sliding surface formed on said second sliding member and running along a direction tilted with respect to the light axis of the headlamp unit in a plane including the directions parallel and perpendicular to the light axis of the headlamp unit, said at least one second sliding surface sliding over said at least one first sliding surface.

18. The vehicle headlight as claimed in claim 17, wherein said at least one first sliding surface and said at least one second sliding surface are located in front of said at least one slit and said at least one pin.

19. The vehicle headlight as claimed in claim 15, wherein said drive means is a solenoid located in a rear direction of said first sliding member.

20. The vehicle headlight as claimed in claim 12, wherein said vehicle headlamp unit further comprises a first shade fixed to said base for shielding a part of light radiated from said discharge lamp.

21. The vehicle headlight as claimed in claim 20, wherein said vehicle headlamp unit further comprises a second shade detachably attached to a top end section of said first shade for shielding a part of light forwardly radiated from said discharge lamp.

22. The vehicle headlight as claimed in claim 12, wherein said base of the headlamp unit is a base being compatible with a base of an HB-5 type halogen bulb.

* * * * *